UNITED STATES PATENT OFFICE.

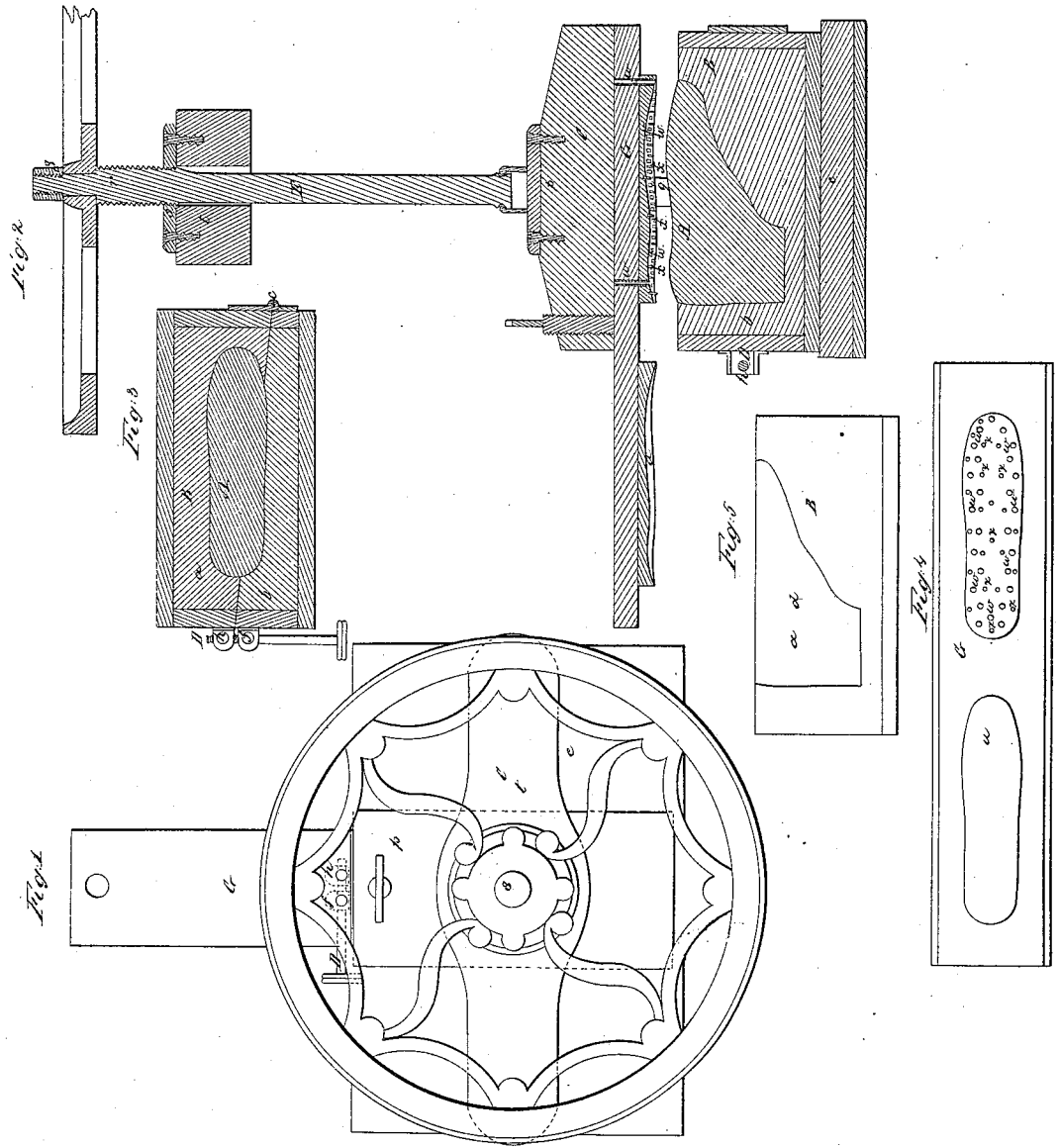
Rice & Whorf,
Lasting Machine,
N° 13,798.   Patented Nov. 13, 1855.

CHARLES RICE, OF BOSTON, AND SYLVANUS H. WHORF, OF ROXBURY, MASSACHUSETTS.

LASTING AND APPLYING SOLES TO SHOES.

Specification of Letters Patent No. 13,798, dated November 13, 1855.

*To all whom it may concern:*

Be it known that we, CHARLES RICE, of Boston, in the county of Suffolk, and SYLVANUS H. WHORF, of Roxbury, in the county of Norfolk, and State of Massachusetts, have invented a new and useful Machine for Lasting Shoes and Applying Soles Thereto; and we do hereby declare that the same is fully described and represented in the following specification and the accompanying drawings, letters, figures, and references thereof.

Of such drawings, Figure 1, denotes a top view of the said machine; Fig. 2, a vertical, central and longitudinal section of it; Fig. 3, a horizontal section of its clamping mold or bed; Fig. 4 is an underside view of the sliding guide plate, the expressing die, and punching mechanism.

This invention consists, first of a common shoe last, A, on which the "upper" of a shoe is to be placed, or the last arranged within the upper preparatory to both being disposed within the second or next portion of the mechanism; which consists of a clamping mold or bed, B, so constructed or formed as to surround the last and upper thereon, clamp or hold the former firmly to the latter, and support both during the process of applying the outer sole thereto. This second portion of the mechanism we usually construct in two parts or halves $a$, $b$, see Fig. 3, and apply them together by a hinge as seen at $c$, so that they may work apart or close together, like the two portions of a common bullet mold, each portion, $a$, or $b$, being formed with a concavity, semimatrix, or recess, $d$, (see Fig. 5, which is an inner side elevation of one of the parts $a$, or $b$,) properly formed to receive and fit closely against the upper or upper leather, when such is on the last arranged within the clamping bed as seen in Fig. 2. The two parts, $a$, and, $b$, may be closed upon the last by means of a screw, D, working through and against a projection, $f$, applied to the part, $b$, the said screw being screwed into another and similar projection $h$, extended from the part $a$, as seen in Figs. 1, 2, and 3. The next or third portion of the machine consists of a press, C, upon whose bed plate, $e$, the clamping mold or bed B, is supported as seen in the drawings. The platen, P, of said press slides between upright guides or rods, $q$, $q$, and is forced downward by means of a male screw, $r$, formed upon a vertical rod, E, and made to operate in and through a female screw, $s'$, adapted to a cross bar, $t$, as seen in Fig. 2. That part of the rod E, which is below its male screw, we make of a diameter less than that of the screw, in order that the rod may be capable of being moved freely either upward or downward in the female screw, and this so that in case the platen and mechanism connected therewith, are counterbalanced by a weight or other contrivance, they may be easily elevated or depressed after they have been raised to their highest position to which they are capable of being elevated by the screw.

The platen of the press is furnished with a sliding plate, G, so dovetailed or applied thereto as to be capable of being moved longitudinally over the last A. The under surface of this plate, G, is to be made to fit the outer surface of the sole or is to be provided with a concavity or stamping die, $u$, for such purpose. It is also furnished with another concavity, $v$, similarly made in form, but carrying a series of punches, $w$, $w$, and $x$, $x$, arranged as seen in Figs. 2 and 4. The several punches, $w$, are what are termed tubular punches, their object being to remove portions of the upper leather and inner sole and for the purpose of enabling the cement used in fixing the outer sole and overlapping portions of the upper to the inner sole to penetrate into or through the said parts. The pointed punches, $x$, are intended simply to indent or puncture the surface to which the outer sole is to be cemented.

The above described machine is to be used during the process of fixing together by cement the inner and outer soles and upper of a shoe or boot. In using such machine, the inner sole and the upper are first placed together upon a last, the upper being made to overlap the outer surface of the insole and affixed thereto by cement. The whole being thus prepared, is next placed within the clamping bed or mold and the parts of the latter closed and securely fastened together. Next, the platen of the press is to be depressed so as to carry the punches into contact with the parts of the upper which overlap the inner sole so as to make perforations or holes through them and either into or through the inner sole. This having been done, the platen is next to be elevated and cement applied to the outer surface of the inner sole and overlapping parts of the upper. Next, the outer sole is to be laid upon cement surfaces and the slide, G, moved so as to bring its concavity or die $u$, directly over the last A. Next, the press block or platen is to be forced down upon the outer sole so as to press it closely in contact with the shoe and expel from between the soles, the superfluous cement.

In each position, which the slide, G, is made to assume during the aforesaid operations, it may be held by a clamping screw arranged as seen at $y$. If necessary, the press block may be made with a chamber for the purpose of receiving steam or some other suitable heating medium, whereby, the slide, G, may be heated, in case such should be desirable in order to dry or set the cement.

We are aware that bed, platen and cutters for stamping out soles or heels for boots or shoes have been used in combination, therefore we do not claim such as such mechanism is for a purpose entirely different from that of our machine as hereinbefore specified, the object of such machine being to "last" a shoe and apply a sole or soles by means of cement. In order to accomplish this, it becomes absolutely necessary not only that the shoe should be supported on a last, but that it should be inclosed in an embracing bed or case, which will prevent it from being improperly strained or stretched while on the last and subjected to the great pressure required to effect the perforating and pressing operations as hereinbefore explained. This is particularly necessary when the upper of the shoe is made from cloth.

We are also aware that in order to form a sole on a shoe gutta percha has been spread in a mold and while therein and in a soft or liquid state has been pressed against the insole and overlapping part of the upper of a shoe.

This differs materially from our invention, for under such circumstances, no lasting clamp is used to hold the shoe and the last and aid in lasting the shoe while its upper is being connected to the insole by cement and pressure.

Consequently, what we claim, is—

The holding clamp, B, and last, A, as used together and in connection with the pressing or puncturing mechanism or both and for the purpose of fixing soles to shoes by cement, substantially as hereinbefore set forth.

In testimony whereof we have hereunto set our hands and seals this twenty sixth day of June A. D. 1855.

CHARLES RICE.
SYLVANUS H. WHORF.

Witnesses:
R. H. Eddy,
Jas. Neal.